Jan. 2, 1940.     H. ZIEBOLZ     2,185,970

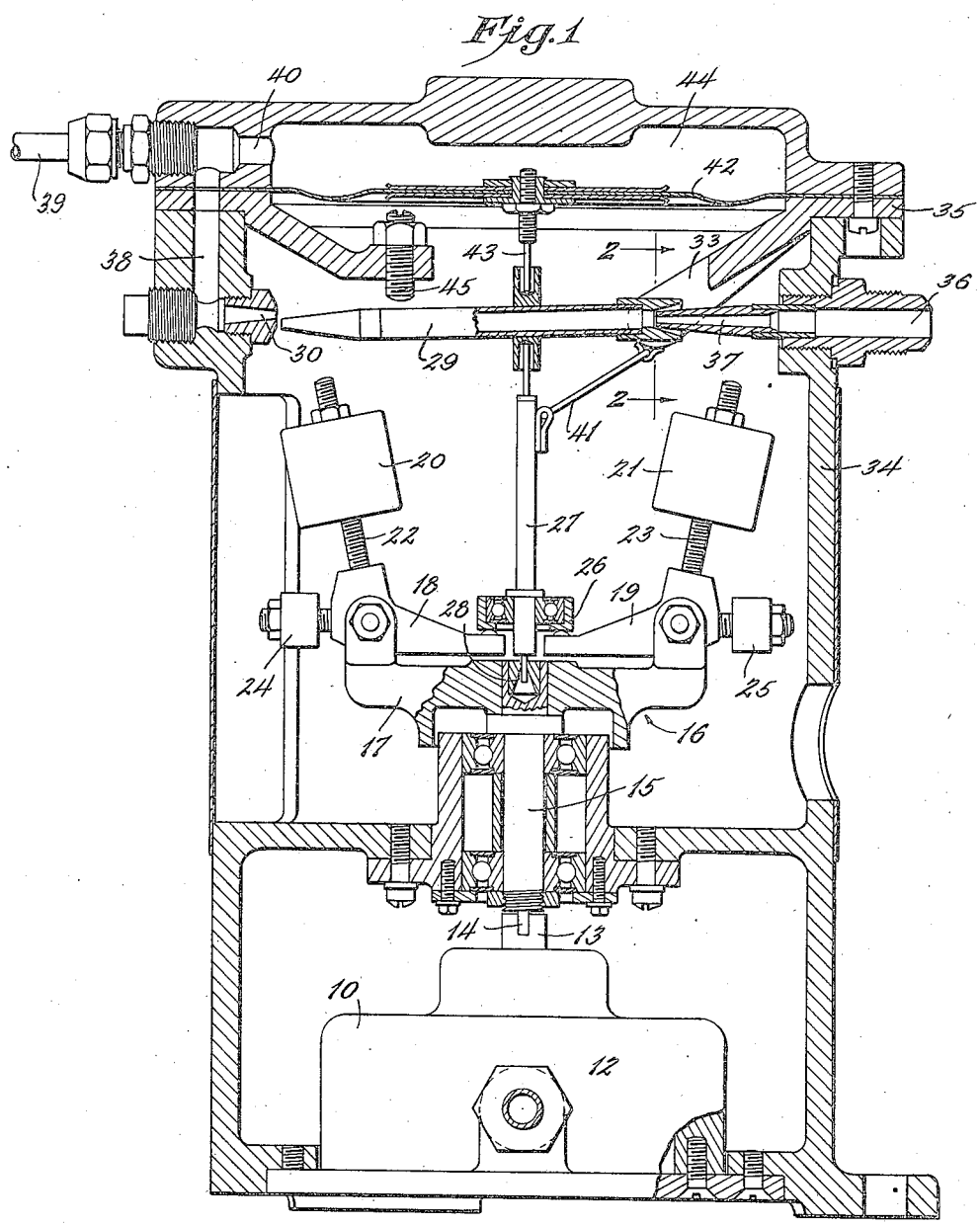

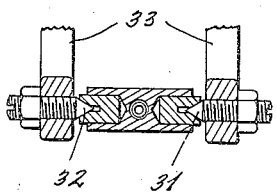
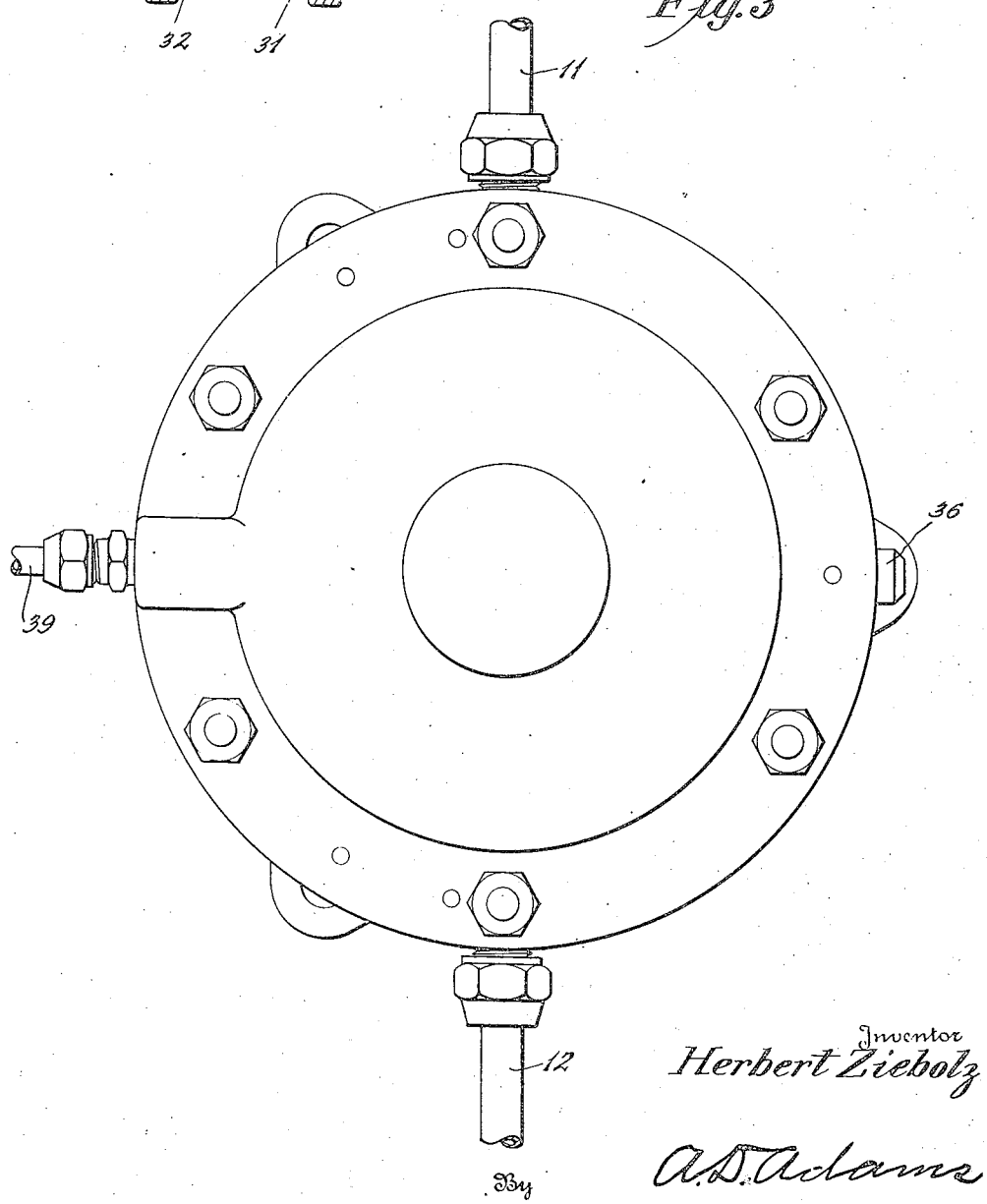

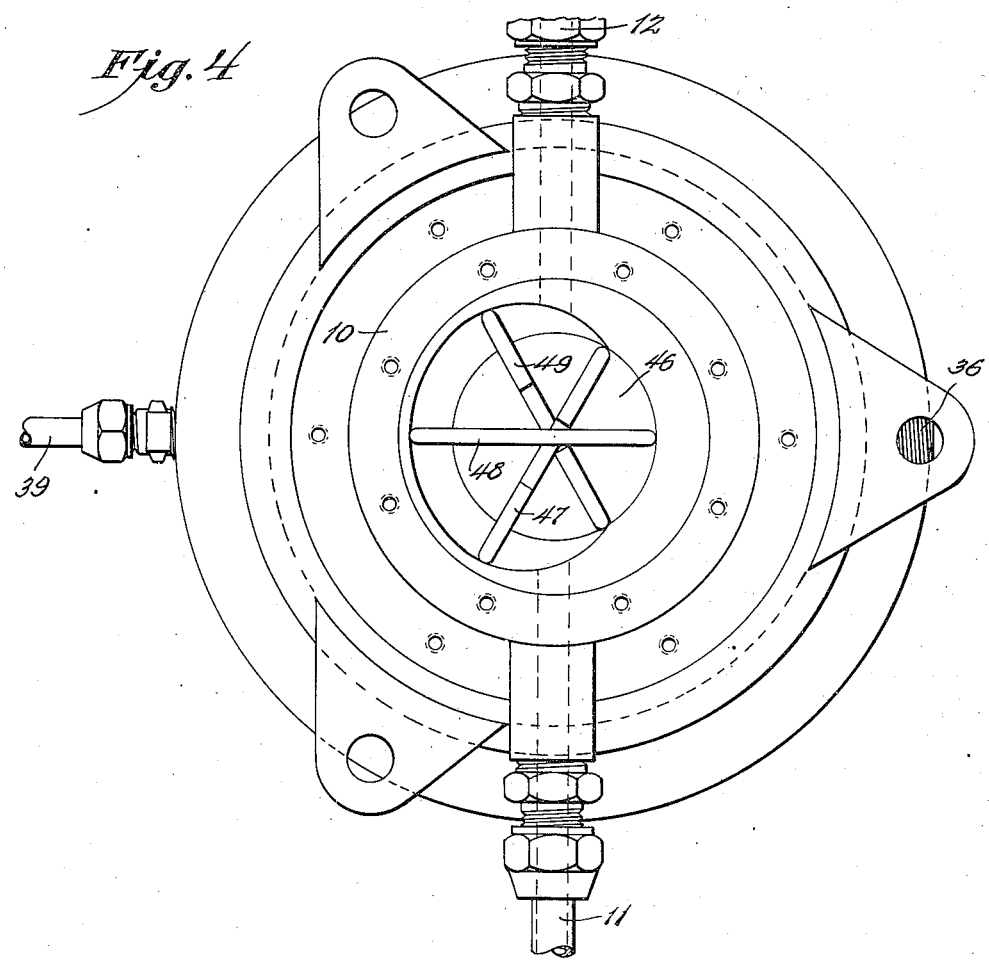

APPARATUS FOR CONTROLLING THE FLOW OF FLUIDS

Filed Dec. 21, 1936     4 Sheets-Sheet 4

Inventor
Herbert Ziebolz

A. D. Adams

By

Attorney

Patented Jan. 2, 1940

2,185,970

UNITED STATES PATENT OFFICE 2,185,970

APPARATUS FOR CONTROLLING THE FLOW OF FLUIDS

Herbert Ziebolz, Chicago, Ill., assignor to Askania-Werke A. G., a corporation of Germany Application December 21, 1936, Serial No. 117,041

8 Claims. (Cl. 137—164)

This invention relates to regulating apparatus for controlling the flow of fluids. More particularly the invention aims to provide rugged, reliable and sensitive apparatus for controlling the flow of fluids under high pressure and of fluids of high viscosity, such as oil, tar and the like. The invention further embraces an improved relay especially adapted for controlling the flow of such fluids.

The problem of controlling fluids under high pressure and fluids of high viscosity presents considerable difficulties. The conventional diaphragm systems for operating controlling instruments prove unsatisfactory as differential pressure systems are apt to leak while single pressure systems show a lack of sensitivity because of their construction which has to withstand the total pressure of the fluid to be regulated.

Heavy oils, such as tar, which have to be passed through conduits in a heated state to lessen their viscosity do not permit of the use of the usual constrictions in the conduits and lines extending therefrom, since the oil tends to congeal in lines of relatively small cross section thereby rendering the controlling apparatus inoperative.

The invention aims to provide reliable and highly sensitive regulating apparatus which are free from the above-explained disadvantages.

The improved results are accomplished by passing the fluid that is to be regulated through a rotary fluid motor, preferably of the positive displacement type. The rotary motor which may be a sliding vane motor or in the nature of a turbine drives a small governor acting on the centrifugal force principle. The governor will hereinafter be called fly-ball governor. The fly-ball governor, in turn, acts on a relay, preferably of the pressure-fluid type, and sets up impulses which are proportional to the centrifugal force of the governor and the square of the flow of the fluid to be regulated, respectively.

These and other advantages and objects will appear from a consideration of the description which follows with the accompanying drawings showing embodiments of the invention for illustrative purposes. It is to be understood that this detailed description is not be taken in a limiting sense, the scope of the invention being defined by the appended claims.

Referring to the drawings:

Fig. 1 is an elevation of a rotary fluid motor, fly-ball governor, and a pressure fluid relay, partly shown in section;

Fig. 2 is a sectional view taken on line 2—2 of Fig. 1;

Fig. 3 is a plan view of the apparatus shown in Fig. 1;

Fig. 4 is a view at the bottom of the rotary motor of Fig. 1 with the bottom plate removed;

Figures 1, 2 and 3 show by way of example a preferred constructional design of a rotary fluid motor, fly-ball governor and a fluid pressure relay for practicing the invention.

Figure 5:
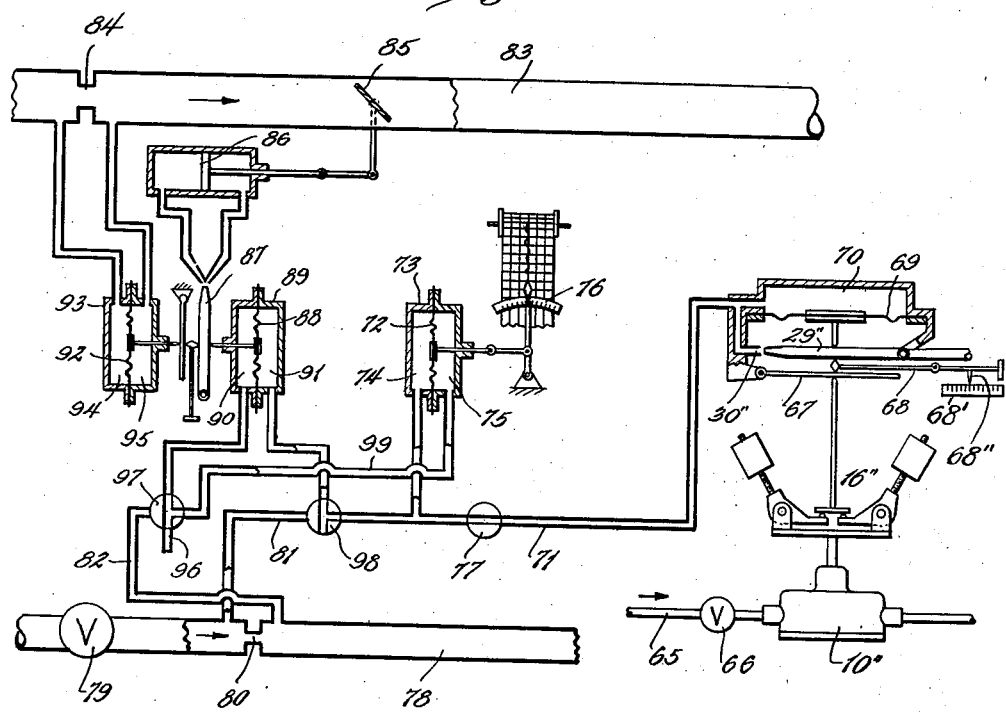
Fig. 5 is a diagrammatic illustration of another regulating apparatus.

The fluid to be regulated enters the casing 10 of a rotary fluid motor through a pipe coupling 11, leaving the casing at the opposite side through another coupling 12. The shaft 13 of the motor is connected at 14 with the vertical shaft 15 of a fly ball governor 16. The governor 16 is shown as comprising a rotatable table 17 carrying in pivotal bearings bell-crank-shaped levers 18 and 19. On the one arm of the levers fly balls 20 and 21 are adjustably mounted on threaded stems 22 and 23 and adjustable weights 24 and 25 are provided for balancing the movable system. The other arms of the levers bear against a collar 26 rotatably mounted on a vertical spindle 27 which is axially movable in a bearing 28 of the table 17. The upper end of the spindle engages with a pressure fluid relay shown as being of the well-known "Askania" jet pipe type.

The relay comprises a jet-pipe 29 and a reception orifice 30. The jet-pipe 29 is shown as pivotally mounted about an axis 31, 32 (Fig. 2) in downwardly extending arms 33 of the instrument casing 34, 35. The jet pipe is supplied with fluid under pressure admitted through a pipe coupling 36 and discharges part or all of the fluid into the reception orifice 30, depending upon the relative position of the jet pipe and orifice, thereby setting up a pressure in conduits 38, 39, 40 communicating with the orifice. There is further provided a link connection 41 between the arm 33 and the spindle 27 to prevent the latter from turning.

A pressure responsive device shown as a diaphragm 42 engages the jet pipe by means of a pin 43 and exerts on the relay a restoring action in opposition to the impulses of the governor 16. The diaphragm is shown as closing a chamber 44 communicating with the reception orifice through the conduit 40. A stop 45 prevents an excessive upward movement of the jet-pipe.

The operation of the device shown in Fig. 1 is as follows: As the motor drives the governor, the fly-balls spread and lift the vertical spindle axially, thereby moving the jet-pipe to register to an increasing degree with the reception orifice. The pressure fluid jet issuing from the jet-pipe sets up a pressure inside the diaphragm chamber thereby forcing the jet-pipe downwardly again until a state of equilibrium is reached when the governing impulse of the fly-ball governor is opposed by an equal restoring impulse from the diaphragm.

It becomes thus easily apparent that the pressure inside the diaphragm casing is at all times a function of the centrifugal force, respectively of the rate of the flow of fluid driving the rotary motor. Since the centrifugal force is proportional to the square of the speed of the motor, the pressure-impulse created by the pressure fluid relay becomes proportional to the square of the rate of flow of the fluid.

The rotary motor is shown in Fig. 4. The rotor body 46 which is integral with or connected to the driving shaft 15 is provided with slots carrying sliding vanes 47, 48 and 49. Fluid entering through one pipe coupling strikes the vanes thereby moving the rotor and leaves the casing again by the opposite pipe coupling. It is understood, however, that other types of rotary fluid motors, well known in the art, may be used in connection with a fly-ball governor.

An apparatus for controlling the flow of oil and gas alternately used for combustion and for controlling air in proportion to the fuel is diagrammatically shown in Fig. 5.

Oil is supplied to a burner (not shown) through a conduit 65, equipped with a valve 66 for shutting off the supply of oil if desired. The oil drives a motor 10'' spinning a fly-ball governor 16''. The pressure fluid relay shown as being a jet pipe 29'' is operated by the governor 16'' by means of a ratio varying device well known in connection with jet pipe relays. The ratio varying device comprises a ratio lever 67 and a ratio slider 68 associated with the movable jet pipe 29''. As a restoring device there is shown a diaphragm 69 closing a diaphragm chamber 70 and acted upon by the pressure set up by the jet pipe in the orifice 30'' further communicating with a pipe 71. When the ratio slider 68 of the jet-pipe relay which may be provided with an indicating scale 68' and pointer 68'' is displaced towards the pivotal point of the ratio lever 67, the force exerted by the restoring diaphragm 69 has to be relatively greater to balance the relay against the governing impulses. In other words by so displacing the ratio slider the magnitude of the pressure impulses created by the relay is increased. The pressure impulse pipe 71 leads to a meter or recorder comprising a pressure responsive device shown as a diaphragm 72 dividing a casing 73 into two chamber 74 and 75. The meter further comprises an indicating or recording mechanism 76 which may be of conventional construction. A valve 77 in the pipe 71 permits to shut off the meter from the pressure fluid relay.

A further conduit 78 is provided for the supply of gas to the burner (not shown). The conduit 78 may be shut off by means of a valve 79 and the flow of gas passing through the same may be measured by a flow responsive device shown as being a constriction 80 setting up in pipes 81 and 82 a differential pressure impulse which is a parabolic function of the flow.

Combustion air is conducted through a third conduit 83 having a flow responsive device therein shown as being a constriction 84 and a device for regulating the flow of air shown as being a butterfly-valve 85 operable by a servo motor 86. The servo motor 86 forms a part of a regulator comprising additionally a jet pipe relay 87 with the usual ratio varying device, a controlling device shown as being a diaphragm 88 dividing a casing 89 into two chambers 90 and 91, and a restoring device shown as also being a diaphragm 92 dividing a casing 93 into chambers 94 and 95. The chambers 94 and 95 are connected to opposite sides of the constriction 84. The chambers 90 and 91 may either be connected to the atmosphere at 96 and the pipe 71 respectively, or to pipes 82 and 81, leading to opposite sides of the constriction by means of two three-way valves 97 and 98. A further pipe 99 is provided between the valve 97 and the diaphragm chamber 75.

In the position shown in the drawing the regulator and the meter are operatively connected to the jet-pipe relay 29''. The pressure set up in the chamber 70 also acts in the chamber 74 of the meter and in the chamber 91 of the controlling regulator diaphragm. The remaining chambers 75 and 90 are vented into the atmosphere through the valve 97 at 96.

Figure 6:
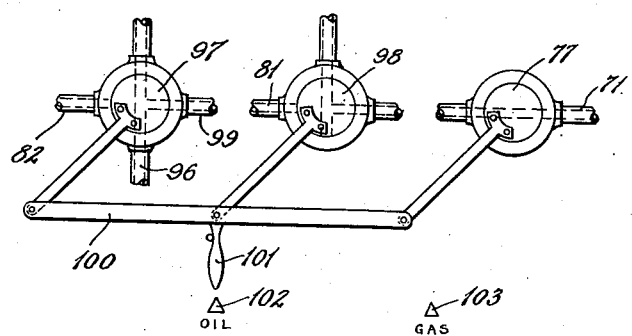
Fig. 6 shows diagrammatically an operative connection of valves shown in Fig. 6.

The three valves 97, 98 and 77 may be interconnected to be moved conjointly. A suitable operative connection is shown in Fig. 6. A linkage 100 movable by a handle 101 is provided for moving the valves. Marks 102 and 103 may be provided to indicate the operative connection of the regulator and meter system effected by the valves in their relative position.

The operation of the device shown in Fig. 5 is as follows:

If oil is desired to be burned the gas valve 79 is maintained closed and the oil valve 66 opened. The pressure fluid relay 29'' controlled by the rotary motor and fly ball governor creates pressure impulses in pipe 71 which are proportional to the square of the oil flow. The pressure impulses operate the meter and recorder 76 indicating the amount of oil flowing through the oil conduit per time unit. By regulating the valve 66 any desired flow of oil may be obtained which will be indicated at the meter. The meter may for this purpose be equipped with a scale calibrated in thermal units. The pressure impulses furthermore act on the controlling diaphragm 88 of the air flow regulator. Upon an increase in oil flow the pressure inside the chamber 91 increases and the diaphragm 80 will move the jet pipe 87 to the left. The resulting increase in pressure in the left orifice conduit of the jet-pipe regulator causes the servo motor 86 to open the valve 85, thereby increasing the flow of combustion air until the restoring differential pressure impulse taken at the constriction 84 equals the controlling impulse at 88. An initial air-to-fuel ratio may be set at the ratio varying device of the regulator 87. It is apparent that the supply of combustion air will in the above explained manner be automatically regulated in response to the fuel supply.

If gas is desired to be burned instead of oil the valves 97, 98 and 77 are moved into the second position indicated by the "gas" mark 103. The regulator and meter are thereby connected to be governed by impulses taken at the constriction 80 of the gas line. The oil valve 66 is maintained closed and the gas valve 79 opened until the meter 76 reads the desired value. Upon an increase in the flow of gas the differential pressure impulse taken at the constriction 80 will increase proportional to the square of the gas flow and in the same manner as hereinbefore explained in connection with the oil flow impulse act on the regulator to increase the supply of combustion air.

The magnitude of the oil flow impulses created by the relay 29'' may be adjusted relatively to the magnitude of the gas impulses taken at the constriction 80 by means of the ratio varying device 68. This feature permits of the use of a single scale for the meter 76.

One feature of the apparatus shown in Fig. 5 is among others the use of only one regulator and one meter in a furnace or heating plant in which gas and oil are alternately used.

Obviously the present invention is not restricted to the particular embodiments thereof herein shown and described. Moreover it is not indispensible that all the features of the invention be used conjointly, since they may be employed advantageously in various combinations and sub-combinations.

What is claimed is:

1. Regulating apparatus comprising, in combination, a fuel conduit; a rotary flow motor in said conduit; a fly-ball governor connected to be operated by said flow motor; a pressure fluid relay controlled by said governor; an air conduit; a constriction in said air conduit; means responsive to a differential pressure taken at the constriction and connected to act on said relay in opposition to said governor; and means actuated by said relay for varying the flow of air through said conduit.

2. Regulating apparatus comprising, in combination, a fuel conduit; a rotary flow motor in said conduit; a flyball governor connected to be operated by said flow motor; a pressure fluid relay controlled by said governor; a pressure responsive device actuated by impulses from said pressure fluid relay and connected to act on said relay in opposition to said governor; an air conduit; a valve in said air conduit; a servo motor for operating said valve; a second relay connected to be controlled by impulses of the first relay for operating said servo motor; and means responsive to the flow of air through said air conduit and connected to act on said second relay in opposition to the impulses of the first relay.

3. Regulating apparatus comprising, in combination, a fuel conduit; a rotary flow motor in said conduit; a fly-ball governor connected to be operated by said flow motor; a pressure fluid relay controlled by said governor; a pressure responsive device actuated by impulses from said pressure fluid relay and connected to act on said relay in opposition to said governor; an air conduit; a valve in said air conduit; a servo-motor for operating said valve; a second relay connected to be controlled by impulses of the first relay for operating said servo-motor; a constriction in said air conduit; and means responsive to a differential pressure taken at the constriction and connected to act on said second relay in opposition to the impulses from said first relay.

4. Regulating apparatus comprising, in combination, means for creating an impulse force which is proportional to the square of the change of a first condition; a relay connected to be responsive to said impulse force; a fly-ball governor connected to be operated in response to the magnitude of a second condition and connected to act on said relay; and means connected to be actuated by said relay for adjusting one of said conditions, whereby both conditions are maintained in a predetermined relation.

5. Regulating apparatus comprising, in combination, a first conduit; a rotary flow motor in said conduit; a fly-ball governor connected to be operated by said flow motor; a relay connected to be controlled by said governor; a second conduit; a valve in said second conduit; a servomotor connected to be actuated by said relay for operating said valve; a constriction in said second conduit; and means responsive to a differential pressure taken at the constriction and connected to act on said relay in opposition to said fly-ball governor, whereby the flow in said second conduit is controlled in response to the flow in said first conduit.

6. Regulating apparatus comprising, in combination, means for creating an impulse force which is proportional to the square of the change of a first condition; a relay connected to be responsive to said impulse force; a fly-ball governor connected to be operated in response to the magnitude of a second condition; a pressure fluid chamber having a movable wall; a pressure fluid relay connected to control the flow of a pressure fluid into said chamber and create a pressure therein; an operative connection between said governor and said pressure fluid relay for moving said pressure fluid relay in exact proportion to the governor movements irrespective of the movements of said movable chamber wall; an operative connection between said pressure fluid relay and said chamber wall so arranged that the pressure in the chamber at the connection opposes the action of the governor on said pressure fluid relay and vice versa, whereby the pressure in said chamber becomes proportional to the square of the rate of rotation of the governor; means connecting said chamber so that the pressure fluid therein acts upon said first mentioned relay; and means connected to be actuated by said first mentioned relay for adjusting one of said conditions to maintain a predetermined relation between both conditions.

7. Regulating apparatus comprising, in combination, means for creating an impulse force which is proportional to the square of the change of a first condition; a relay connected to be responsive to said impulse force; a fly-ball governor connected to be operated in response to the magnitude of a second condition; a pressure fluid diaphragm chamber having a movable diaphragm; a jet pipe relay including a movable jet pipe and connected to control a flow of pressure fluid into said chamber to act on said diaphragm; an operative connection between said governor and said jet pipe relay for moving said jet pipe in exact proportion to the governor movements irrespective of movements of said diaphragm; and an operative connection between said governor and said diaphragm so arranged that the pressure in the chamber at the connection opposes the action of the governor on said jet pipe and vice versa, whereby the pressure on said diaphragm becomes proportional to the square of the rate of rotation of the governor; means connecting said chamber so that the pressure fluid therein acts upon said first mentioned relay; and means connected to be actuated by said first mentioned relay for adjusting one of said conditions to maintain a predetermined relation between both conditions.

8. Regulating apparatus comprising, in combination, means for creating an impulse force which is proportional to the square of the change of the first condition; a relay connected to be responsive to said impulse force; a fly-ball governor connected to be operated in response to the magnitude of a second condition; a jet pipe relay having a movable jet pipe; an adjustable lever connection between said governor and said relay, whereby said relay is actuated in exact proportion to the governor movements; a pressure fluid diaphragm chamber having a movable diaphragm connected to be acted upon by pressure fluid controlled by said relay and also connected to act on said relay in opposition to the governor, whereby the pressure on the diaphragm becomes proportional to the square of the rate of rotation of the governor; means connecting said chamber so that the pressure fluid therein acts upon said first mentioned relay; and means connected to be actuated by said first mentioned relay for adjusting one of said conditions to maintain a predetermined relation between both conditions.

H. ZIEBOLZ.